June 26, 1956 W. R. DICKIE 2,751,806
FASTENER PROVIDED WITH CIRCUMFERENTIAL
FLUID SEALING RING BONDED IN RECESS
Filed Oct. 12, 1953
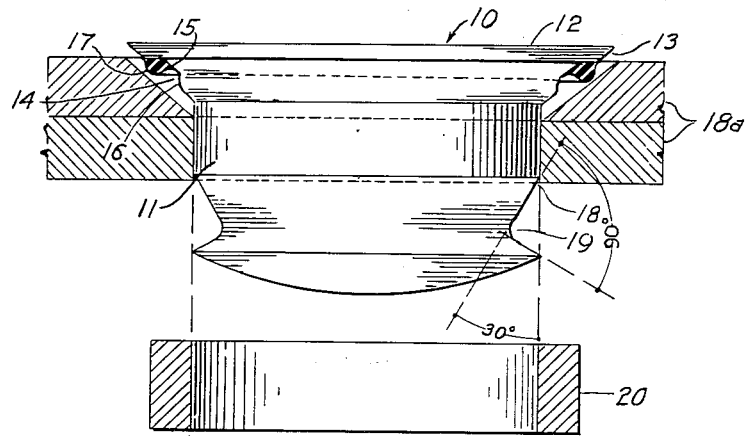
Fig. 1.
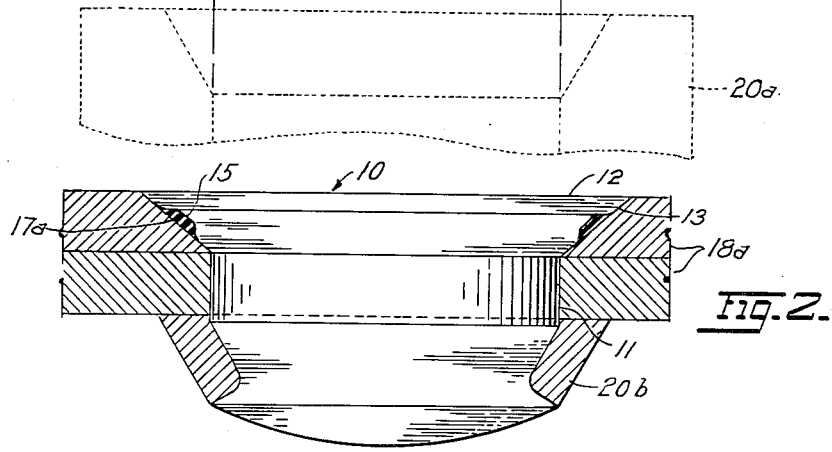
Fig. 2.
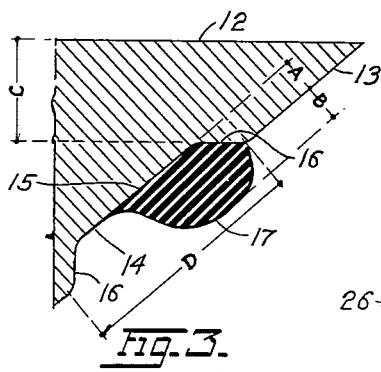
Fig. 3.
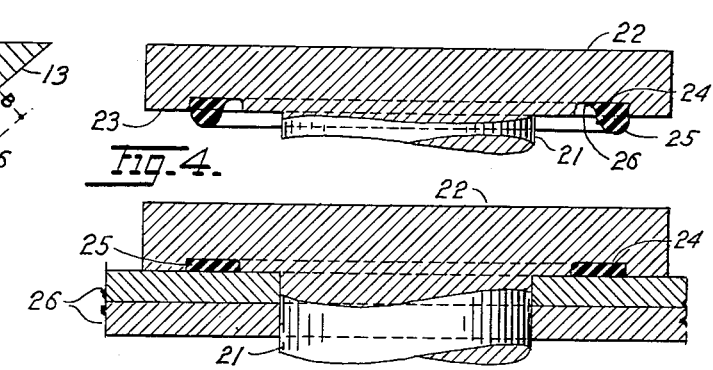
Fig. 4.
Fig. 5.
INVENTOR.
WILLIAM R. DICKIE.
D. Gordon Angus
ATTORNEY.

United States Patent Office 2,751,806
Patented June 26, 1956

2,751,806

FASTENER PROVIDED WITH CIRCUMFERENTIAL FLUID SEALING RING BONDED IN RECESS

William Robert Dickie, Manhattan Beach, Calif., assignor, by mesne assignments, to Hi-Shear Rivet Tool Company, Los Angeles, Calif., a corporation of California Application October 12, 1953, Serial No. 385,463

2 Claims. (Cl. 85—9)

This invention pertains to fluid sealing fasteners, and more particularly to rivet and bolt type fasteners for sealing and joining parts of fluid barriers, such as tanks.

There are frequent situations in which it is desired to rivet plates together in a manner preventing leakage of fluid between them.

In aircraft construction, for example, it is common practice to utilize the inside of a riveted metal structure such as a wing for a fuel tank. The sealing of the overlapping plates has always been a problem, especially at bolt and rivet holes. Fluid will frequently leak past an ordinary driven rivet, since manufacturing tolerances and errors in work often result in an imperfect or incomplete metal-to-metal contact between the rivet and the structure.

Efforts have heretofore been made to make a riveted or bolted joint which seals the rivet hole by providing resilient sealing material around the head or the shank of the fastener. Such devices have usually utilized such expedients as a separate washer with an interior compressible ring, or a simple washer adapted to be crushed between the rivet and the metal parts being joined. But there are disadvantages inherent in such devices. For one, in mass-production assembly operations it is undesirable to use rivet or bolt assemblies which have extra or loose pieces. Another difficulty has resided in the amount and location of placement of the sealant used in such applications, particularly considering the variations implicit in the quality of hand riveting work. Most previous devices have placed the sealant where it was apt to be injected into spaces between the rivet and the work where only a direct metal-to-metal contact should exist. In addition the quantity and distribution of the sealant has been imperfect. Excessive sealant or improperly placed sealant fosters such injection and prevents the necessary complete metal-to-metal contact of proper riveted construction, thereby weakening the joint. Too little sealant around the shank or head, or an unevenly distributed layer will result in an imperfect seal. Also, too little sealant placed in a groove will continue to cold-flow after the rivet is driven and will ultimately fail to seal the hole.

A further disadvantage of washer elements, which are usually partly exposed, is that their sealing materials will come into substantial contact with the air. Since the atmosphere at high altitudes has a relatively high amount of ozone, which is deleterious to most common resilient sealing substances, the sealant has deteriorated with undesirable rapidity when used on airplanes.

An object of the invention is to provide a rivet or fastener assembly for sealing and joining bodies which incorporates sealing means which will seal and retain its sealing power for a long time, while providing a close metal-to-metal contact of rivet and structure.

A feature of the invention resides in a continuous recess around the fastener structure having a resilient sealing ring seated and secured therein which projects out of the recess when the fastener is not tightened down, and which is compressed into the recess when the fastener is tightened down.

An optional feature is the provision of a ring having substantially the same volume and a different cross-section than the recess when the fastener is not tightened down, and the exact volume and cross-section of the recess when the fastener is tightened down.

These and other features of the invention will be fully understood from the following detailed description and the accompanying drawings, of which:

Fig. 1 is a cross-sectional elevation of a two-piece countersunk type rivet with sealing means according to the instant invention, showing the rivet parts, and (in phantom line) the set for driving the rivet;

Fig. 2 is a cross-sectional elevation of the rivet of Fig. 1 in its driven condition;

Fig. 3 is an enlarged fragmentary view of the rivet of Fig. 1, showing the sealing means in greater detail;

Fig. 4 is a fragmentary cross-sectional elevation of a flat-headed rivet according to the invention; and Fig. 5 is a cross-sectional elevation of a portion of rivet of Fig. 4 in its driven condition.

Referring now to the drawings, Fig. 1 shows a fastener in the form of a two piece sealing rivet structure 10 intended for countersunk holes. This rivet has an elongated shank 11 and an enlarged manufactured head 12 with a frusto-conical face 13 on the side of the head adjacent the shank so that this conical face or surface is at the junction of the head and the shank. A continuous circumferential recess 14 of uniform cross-section is formed in the conical face 13 at an intermediate portion thereof, which recess has a substantially flat base surface 15 which is recessed relative to the conical surface 13, and end surfaces 16 which join the base surface 15 with the conical surface 13. These end surfaces 16 diverge from each other in the direction from the base surface toward the conical surface. A sealing ring 17 of resilient elastic material such as natural or synthetic rubber, neoprene, Thiokol, or similar rubbery or rubber-like material having resilient properties, and resistant to the fluid being sealed against, is seated in the recess and has a uniform cross-section which projects beyond face 13. The projecting portion of the seal material forms a circumferential bead. The ring is preferably formed as indicated in the drawing; that is, with the bulk of its material disposed toward one edge of the recess; and preferably this is the upper edge of the recess remote from the shank, as shown. This will leave a circumferential void within the other end of the recess. It is noted that the edge 16 which is remote from the ring material 17 is filleted or rounded where it meets base surface 15. Experiment has shown that such a disposition of material results in the best flow of the ring. The ring, when best designed, flows into the circumferential void of the recess adjacent the lower end surface 16 (with reference to Fig. 3), and because of the elastic memory of the material, exerts a back force on the metal. The material recedes into the circumferential void of the recess near the lower end surface 16.

The ring is bonded to the surface of the recess with which it is in contact, that is, along the base surface 15 and the upper end surface 16 (with reference to Fig. 3), so that the shank, head and sealing ring will be unitary, and the ring will not have a tendency to become separated. The volume of the ring is substantially the same but preferably just slightly greater than that of the recess, so that there is a certain amount of compression of its material when the rivet is driven.

The rivet may be made of stainless steel capable of high shear strength, although it should be understood that other materials of less strength could be used. When a strong hard rivet is used, the aperture or hole 18 through the apertured bodies or sheets 18a to be joined will be a fairly close tolerance, since such a shank will not expand greatly to fit the hole when the rivet is driven. The shank end of the rivet has a groove 19 around it which is spaced a short distance from the end. The rivet is placed in the hole with an end projecting out of the bodies which are to be riveted together, and a cylindrical sleeve 20 of a more malleable metal, such as aluminum, is placed around that end of the rivet. The sleeve may be driven by a set 20a (shown in phantom line) so as to assume the frusto-conical head 20b shown in Fig. 2. A gun and bucking bar (not shown) are applied at the manufactured head. This compresses part of the sleeve into the groove 19 forming a collar which tightens the rivet in place by holding the end projecting through the bodies to be joined.

As in other riveting operations, the rivet is, in effect, driven from both ends, and this action compresses the sealing ring so that it fills the recess and assumes the cross-section of the recess (as bounded by the adjacent metal body).

Fig. 4 shows a flat-headed rivet which acts in the same manner as the above countersunk rivet. In this case, the rivet has a shank 21, a flat head 22, an annular flat surface 23 on the side of the head adjacent the shank, and a continuous annular recess 24 with a substantially rectangular cross-section. A resilient seal 25, similar in every respect to that discussed above, is bonded to the recess. A cylindrical collar (not shown) is forced onto the shank end of the rivet as before, and two bodies 26 are thereby joined.

The sealing means described will work as well on bolts as on rivets, and the rivets may also be single piece structures whose shank ends are upset by bucking to form a head. In some respects, however, the more rigid stainless steel material is to be preferred inasmuch as the relative sizes of the recess and the sealing ring will not be much altered during the driving of the rivet.

The relative volumes of the ring and the recess are critical in this fastener, since too much material will cause injection of the ring material between adjacent metal surfaces which are intended to lie flush with each other. Too little of the sealing material will result in a condition wherein the material will be compressed into the recess, but continue to cold flow into void space and thereby recede from the wall, thus losing the sealing effect. There is, therefore, a narrow range of volume wherein all of the sealant will flow into the recess to make the seal, and still remain sufficiently compressed to maintain a pressure-tight seal without extrusion from the recess or cold flow therein.

The following table shows some typical examples of dimensions for a counter-sunk type rivet, it being understood that many other sizes and dimensions are possible. The dimensions are in inches. With respect to Fig. 3, dimension A is the depth of the recess; dimension B is the distance of projection of the resilient ring from the recess; dimension C is the distance from the top of the rivet to the upper edge of the recess; and dimension D is the width of the recess.

| Rivet Shank Diameter | A | B | C | D |
|---|---|---|---|---|
| 3/16 | .005–.008 | .006 +.002 / –.001 | .017±.0005 | .030±.002 |
| 1/4 | .006–.009 | .007 +.002 / –.001 | .019±.0005 | .035±.002 |
| 5/16 | .007–.010 | .008 +.002 / –.001 | .019±.0005 | .045±.003 |
| 3/8 | .008–.011 | .009 +.002 / –.001 | .022±.0005 | .050±.003 |

The fasteners described above provide a long-lasting fluid seal wherein the sealant material is substantially sealed away from contact both with the fluid and with oxygen and ozone from the atmosphere, and is therefore particularly resistant to deterioration. Due to the exact volume of sealant provided, a pressure-fit by the sealant is assured over a long life. The bonding of the sealant to the structure results in a single-piece rivet and sealant assembly.

My invention is not to be limited by the embodiments described in the description and illustrated in the drawing, but only in accordance with the scope of the appended claims.

I claim:

1. A fastener for holding overlapped apertured bodies together, said fastener having a shank for passing through the apertures and a head at one end of the shank, and a substantially conical surface at the junction of the head and the shank, said surface being adapted to make surface contact with a complementary surface of at least the adjacent one of said apertured bodies, a circumferential recess of uniform cross-section formed in an intermediate portion of said conical surface, said recess comprising a base surface which is recessed relative to said conical surface, and end surfaces joining said base surface to said conical surface, said end surfaces diverging from each other in the direction from the base surface toward the conical surface and at least one of the end surfaces being filleted at its junction with the base surface, and a resilient sealing material of uniform cross-section bonded to at least a substantial portion of said base surface and one of said end surfaces, a part of said sealing material lying within said recess, and the remainder of said sealing material protruding out of said recess in the form of a circumferential bead and leaving a circumferential void within the end of said recess having the filleted end surface when the fastener is not in engagement with said apertures, the volume of the sealing material which protrudes from said recess being equal to the volume of said void, whereby upon engagement of the fastener through the apertures, the sealing material is distorted to completely fill the void and the conical surface makes surface-to-surface contact with said complementary surface on both sides of said recess without any flow of sealing material between said conical and complementary surfaces.

2. A fastener for holding overlapped apertured bodies together, said fastener having a shank for passing through the apertures and a head at one end of the shank, and a substantially laterally extending flat surface at the junction of the head and the shank, said surface being adapted to make surface contact with a complementary surface of at least the adjacent one of said apertured bodies, a circumferential recess of uniform cross-section formed in an intermediate portion of said laterally extending flat surface, said recess comprising a base surface which is recessed relative to said laterally extending flat surface, and end surfaces joining said base surface to said laterally extending flat surface, said end surfaces diverging from each other in the direction from the base surface toward the laterally extending flat surface, and at least one of the end surfaces being filleted at its junction with the base surface, and a resilient sealing material of uniform cross-section bonded to at least a substantial portion of said base surface and one of said end surfaces, a part of said sealing material lying within said recess, the remainder of said sealing material protruding out of said recess in the form of a circumferential bead and leaving a circumferential void within the end of said recess having the filleted end surface when the fastener is not in engagement with said apertures, the volume of the sealing material which protrudes from said recess being equal to the volume of said void, whereby upon engagement of the fastener through the apertures, the sealing material is distorted to completely fill the void and the laterally extending flat surface makes surface-tosurface contact with said complementary surface on both sides of said recess without any flow of sealing material between said laterally extending flat and complementary surfaces.

References Cited in the file of this patent

UNITED STATES PATENTS

| | | |
|---|---|---|
| 316,619 | Hayes | April 28, 1885 |
| 951,437 | Gehrke | Mar. 8, 1910 |
| 1,254,514 | Lehmann | Jan. 22, 1918 |
| 1,976,589 | Trickey | Oct. 9, 1934 |
| 2,001,145 | Lamber | May 14, 1935 |
| 2,355,580 | Wing | Aug. 8, 1944 |
| 2,381,829 | Livers | Aug. 7, 1945 |
| 2,462,023 | Johanson | Feb. 15, 1949 |
| 2,531,048 | Huck | Nov. 21, 1950 |
| 2,657,807 | Launder | Nov. 3, 1953 |

FOREIGN PATENTS

| | | |
|---|---|---|
| 685,966 | Great Britain | Jan. 13, 1953 |